United States Patent [19]

Brelsford

[11] Patent Number: 5,411,594
[45] Date of Patent: May 2, 1995

[54] BEI HYDROLYSIS PROCESS SYSTEM AN IMPROVED PROCESS FOR THE CONTINUOUS HYDROLYSIS SACCHARIFICATION OF LIGNO-CELLULOSICS IN A TWO-STAGE PLUG-FLOW-REACTOR SYSTEM

[76] Inventor: Donald L. Brelsford, 8655 Bridger Canyon Rd., Bozeman, Mont. 59715

[21] Appl. No.: 736,949

[22] Filed: Jul. 8, 1991

[51] Int. Cl.$^6$ .......................... B01J 3/00; C13K 1/02
[52] U.S. Cl. .......................................... 127/37; 127/1; 127/2
[58] Field of Search ................................ 127/37, 1, 2

[56] References Cited

U.S. PATENT DOCUMENTS

| | | | |
|---|---|---|---|
| 4,201,596 | 5/1980 | Church et al. | 127/37 |
| 4,237,226 | 12/1980 | Grethlein | 435/99 |
| 4,384,897 | 5/1983 | Brink | 127/37 |
| 4,612,286 | 9/1986 | Sherman et al. | 435/157 |
| 4,615,742 | 10/1986 | Wright | 127/37 |
| 4,708,746 | 11/1987 | Hinger | 127/37 |
| 5,125,977 | 6/1992 | Grohmann et al. | 127/37 |

OTHER PUBLICATIONS

Brelsford, Donald L. "Development of Cellulose Conversion" The BEI Htdrolysis Process Mar. 1983 Exec Summ. MTDNRC ARE 466-8L.
BEI Proposal to USDOE C&RE I&IP Oct. 24, 1989, Abst & Work Statemt.
USDOC NIST OERI Recommendation to USDOE C&RE I&IP Jan. 18, 1989.

Primary Examiner—Paul Lieberman
Assistant Examiner—P. L. Hailey

[57] ABSTRACT

An improved two-stage dilute-acid hydrolysis process and apparatus the continuous saccharification of ligno-cellulosic biomass, or other cellulosic material feedstocks, with higher efficiency and better economics than known art, is disclosed. It comprises two double-tube heat-exchanger and plug-flow-reactor systems, in series. The improved process is primarily by reverse interstage transfer-flow, opposite to biomass, of second-stage surplus of: 1. process heat, 2. dilute- acid and 3. ingredient and solution water, all in an alpha cellulose hydrolysate, dilute-acid solution. It also comprises recycle of a fraction of unhydrolyzed alpha-cellulose hydrolysis residue, thereby achieving higher hydrolysis conversion of alpha-cellulose to glucose; and providing: 1. lower hydrolysate sugar decomposition, 2. reduced reaction time and 3. increased reactor processing capacity, without increased dimensions. The process is ideal for process control to efficiently produce a primary final liquid product, which is the combined hydrolysate sugars into a single solution, including pentose, hexose and glucose sugars, which are readily fermented into Ethanol and/or Torula Yeast. The secondary final solid product is the resulting net unhydrolyzed lignin residue solids.

10 Claims, 2 Drawing Sheets

BEI HYDROLYSIS PROCESS SYSTEM AN IMPROVED PROCESS FOR THE CONTINUOUS HYDROLYSIS SACCHARIFICATION OF LIGNO-CELLULOSICS IN A TWO-STAGE PLUG-FLOW-REACTOR SYSTEM

BACKGROUND

1. Field of Invention

This Invention relates to chemical hydrolysis processing of renewable lignocellulosic biomass inorder to produce a single solution of sugars and a solid lignin-residue.

2. Description of Prior Art

Here-to-fore, a plug-flow-reactor has been proposed to try to gain higher hydrolysis-conversion of cellulose to glucose, by using extremely-high hydrolysis-rates, achieved by high-temperatures of reaction, as provided by direct-injection of high-pressure steam into high-solids density slurries.

Even-so, hemicellulose hydrolysate sugars are all degraded, by such a single-stage high-temperature polysaccharide hydrolysis reaction process. The hydrolysate-sugars high-dilution by steam condensation causes the resulting single-solution of glucose to have a low-concentration and large-volume with high-cost acid-neutralization, and inefficient fermentation.

U.S. Pat. No. 4,201,596 to Church (1980) shows a continuous process for effecting the acid-hydrolysis of cellulosic waste materials in high-solids density slurries. By control of high temperature, through direct steam injection, the high density slurry solids may be converted to yields of about fifty percent of the potential glucose in cellulose in seconds. This chemical processing method, for converting polysaccharides into pentose and/or hexose sugars, is by a known use of a tubular-type plug-flow-reactor (PFR) for dilute-acid cellulose hydrolysis. Unfortunately, relatively low conversions, negative byproduct formations, high energy-requirements and impractical high-density slurry-pumping to pressure over 500 psi, have limited the commercial use of that cellulose-conversion by PFR method to R&D investigations.

Researchers, at Dartmouth College in 1978–79, were investigating the acid-hydrolysis of municipal refuse and other materials, using a plug-flow-reactor. The Dartmouth research work involved a 1.3-cm (0.5-in.) diameter plug-flow-reactor, operated at temperatures up to 260° C./500° F., with a variety of biomass materials, including mixed hard-wood, newsprint and corn stover; using a feedstock-rate of 120 pounds per day, and a plug-flowreactor (PFR) for dilute-acid, ligno-cellulosic hydrolysis, at solids concentrations up to 13.5 wt %. The system was a continuous-flow electrically-heated tubular reactor.

The Dartmouth research hydrolysis was flashed through an orifice to stop the reaction at residence detention times of 5–30 s., then cooled. Glucose yields from hard-wood flour ranged as high as 55% in 1983. This work showed that high yields were obtainable on a small scale; several operational problems were encountered that were difficult to solve on a small bench-scale system. Problems included tar build-up and rapid plugging of the small-diameter reactor prevented long runs from being conducted to obtain extensive operating experience.

The Dartmouth Process is known to have the following characteristics: 1.) relatively high-density slurries are very difficult to be pumped at high-rates to high-pressures and through the PFR, 2.) very high reaction-temperatures, on the order of 260° C./500° F., require up to 600 psi steam and 3.) very short hydrolysis reaction-times, of fractions of one-minute, for flow through the PFR, generally.

U.S. Pat. No. 4,615,742 of Wright (1986) shows a processing batch percolation-type hydrolysis reactor. In this counter-current hydrolysis, a flow of dilute-acid solution contacts a body of particulate wood which is moving in a direction opposite to the flow of the dilute-acid solution. The counter-current flow of the dilute-acid solution and the particulate wood results in: a much higher yield of sugars from the wood, a minimal degradation and a relatively high concentration of glucose, but the process conditions result in a low xylose in the dilute-acid hydrolysate solution.

The primary dis-advantage of this particular approach, for counter-current hydrolysis, is the extreme mechanical complexity and expense of moving by conveying the solids and pumping the liquids in the opposite directions.

U.S. Pat. No. 4,612,286 of Sherman (1986) shows a method conceived in an attempt to solve the above problems and provide an approximate counter-current flow processing, without the necessity for actual movement of the wood particles. In general, a plurality of Kamyr percolation hydrolysis reactors are piped together, in-series. This method utilizes a counter-current diffusional treatment structure. Cellulose hydrolysis is practiced in upright diffusion vessel with counter-current flow.

U.S. Pat. No. 4,070,232 of Funk (1978) has found that yield and operability are improved by conducting a ligno-cellulose pre-hydrolysis first and then a hydrolysis of the residue. By pre-hydrolysis of the fresh feedstock, at below 150° C., the hemi-cellulose can be hydrolyzed at temperatures where sugar degradation is relatively insignificant. This allows high yields and recovery, by separation of sugars from hemi-cellulose hydrolysis. It also opens up the structure of the wood particles so that: infusion of acid and diffusion of cellulose hydrolysate-sugars are enhanced, minimum fouling in the pipes by tars and limited degradation products.

The present invention's moderate solids-density slurries and moderate hydrolysis-reaction temperatures and the improvement for recycle of a fraction of unhydrolyzed alpha cellulose residue in stage-two, provides about 65% cellulose to glucose conversion, compared to about 50% for known processes. In addition, other process improvements in the present invention result in over two-times higher hydrolysate-sugar concentrations in a single-solution of two-hydrolysates product, than that of known single solution processes.

SUMMARY OF THE INVENTION

It is a primary object of this invention to provide an improved two-stage hydrolysis process for the continuous dilute-acid saccharification of ligno-cellulosics in biomass, or of other cellulosic materials, to produce hydrolysate sugars in a single-solution, of moderate-concentration, and a solid lignin-residue, and including four cellulose hydrolysis process improvements.

In stage-one, the fresh cellulosic-feedstock is admixed with hot, pressurized dilute-acid water-solution. The resulting heated aqueous feedstock slurry is further heated, by additional surplus process-heat as flashed-steam. Both of these surplus process-heat supplies are from stage-two.

That heated fresh cellulosic feedstock slurry, containing 10 wt % to 20 wt % solids, is therefore ready for immediate hemicellulose hydrolysis reaction processing in stage-one. All of stage-ones' process heat is supplied by reverse, inter-stage, transfer-flow, from stage-two, of: 1) flash-steam and 2) hot, pressurized alpha-cellulose-hydrolysate & dilute-acid solution.

That transferred surplus process-heat completely provides for hemicellulose hydrolysis processing, at reaction-temperature of 135° to 195° C., saturated-pressure of 45 to 200 psia, and hydrolysis reaction time of 1 to 20 min. The resulting hemicellulose hydrolysis reaction slurry is flashed to a reduced-pressure to terminate degradation of sugars and to generate the stage-one surplus flash-steam process-heat supply.

The flashed, reduced-temperature, hemi-cellulose hydrolyzed slurry is separated into: 1) a single-solution, including the combined hemi-cellulose hydrolysate pentose- and hexose- sugars and the alpha cellulose hydrolysate glucose-sugar. and 2) an unhydrolyzed cellulosic solids-residue, which is passed-on to stage-two as part make-up for the alpha-cellulose hydrolysis feedstock. That single-solution, from stage-one slurry-separation, is the final liquid product, of the improved process of this invention.

In stage-two, the unhydrolyzed cellulosic residue the stage-one is admixed with the recycled-fraction of unhydrolyzed alpha-cellulose residue, within stage-two. Together they are admixed with fresh dilute-acid water-solution into the alpha cellulose hydrolysis reaction feedstock slurry, with 10 wt % to 20 wt % solids. The fresh dilute-acid solution is pre-heated by stage-one surplus flash-steam process-heat.

In stage-two, fresh, high-temperature process-heat is supplied for alpha-cellulose hydrolysis reaction processing, at temperature of 165° to 260° C., saturated pressure of 100 to 200 psia and hydrolysis reaction time of 0.5 to 20 minutes, to produce alpha-cellulose hydrolysate glucose-sugar, dissolved in the dilute-acid water-solution of stage-two.

Subsequently, stage-two reaction process slurry is flashed to terminate glucose-sugar degradation. The alpha-cellulose hydrolysis slurry is then separated inorder to recover: 1) surplus process-heat as flash-steam, 2) at hot saturated-pressure, alpha-cellulose hydrolyzate and dilute-acid water-solution, and 3) unhydrolyzed alpha-cellulose solids, with lignin.

It is a specific object that three of the four cellulose hydrolysis process improvements are the result of the reverse, inter-stage, transfer-flow, from stage-two to stage-one, of: 1) dilute-acid catalyst, 2) surplus process-heat supply and 3) surplus ingredient and solution water-supply.

It is another specific object that the fourth cellulose hydrolysis process improvement of the invention is in stage-two, and is that up-to 50 wt % recycle of unhydrolyzed alpha-cellulose solids residue, after it's separation from the hot, pressurized hydrolysate-sugar and dilute-acid solution; all within stage-two. That recycled fraction is used identically with the regular alpha cellulose hydrolysis feedstock, from stage-one, hemicellulose hydrolysis processing. However, the remaining, not-recycled fraction is the final solids lignin residue product of the improved cellulose hydrolysis process of this invention.

It is another object that the best method for operation of this improved process invention will be with an apparatus made up of two double-tube heat-exchanger plug-flow-reactor systems, in series. Each of it's stage's will includes: 1) slurry mixing and feeding means, 2) slurry pumping and pressurizing means, 3) tubular reactor, as inner tube of double-tube heat-exchanger plug-flow-reactor, 4) heat-exchanger, provided by annulus between the inner tube and outer tube, 5) slurry flash means for pressure reduction, 6) reduced pressure slurry sparation means and 7) reduced pressure hydrolysate solution process storage means, and also includes a reverse-interstage-transfer-flow means for: 1) hot, pressurized alpha-cellulose hydrolysate and dilute-acid solution, 2) stage-two flashed-steam, to be the stage-one process-heat supply, and 3) provisions to produce the combined hemi-cellulose and alpha-cellulose hydrolysates sugars in a single- solution, and as the final liquid product.

It is a further object that the critical hydrolysis reaction-factors, required for each stage's hydrolysis processing, are originally added only in stage-two, and are: 1) fresh dilute-acid in water-solution and 2) fresh high-temperature process heat.

Another object is that the multi-beneficial results from recycling of up-to 50 wt % of the unhydrolyzed alpha cellulose solids residue, within stage-two, include: 1) increased net-conversion of alpha-cellulose to glucose sugar, 2) reduction in the normally required alpha-cellulose hydrolysis reaction processing time, 3) thereby reducing the reaction time exposure of hydrolysate glucose sugars to degradation and 4) an automatic increase in the effective and useful capacity of the alpha cellulose hydrolysis reactor, by about 15%.

It is a further object that the improvements in this process provides-for about 36% reduction of acid costs and 30% less energy costs, and that the recycle of unhydrolyzed alpha-cellulose solids-residue, within stage-two, increases it's net-conversion of alpha-cellulose to glucose by +12%.

A major object of the process improvement of this invention is that it provides for the production of a single solution which has a relative high concentration of all of the pentose and hexose sugars because of the combination of the hemicellulose (HC) and alpha-cellulose (AC) sugars in solutions. The hydrolysis conditions of both stages are pre-arranged to maximize the yields of the various sugars produced into a single solution, produced by the improved process of the invention. The resulting high concentration of pentose and hexose sugars in the single solution product can be valuably used by a variety of yeast fermentation and chemical processing methods.

Typical Example

The hemi-cellulose (HC) fraction of Pine-Soft-Wood can be relatively easily hydrolyzed into xylose-pentose and hexose sugars. The pine-wood HC hydrolysis results, by typical Improved Hydrolysis Process Pine-Soft-Wood HC hydrolysis conditions, is a function of HC hydrolysis reaction time, $t_r$, =up to 14 minutes; at reaction temperature, $T_r$, =135° C./275° F. and acid concentration, $C_{acid}$=2.00%.

The HC hexan is a fraction of about 0.72 and the HC xylan is a fraction of about 0.28 of the typical pinewood hemi-cellulose raw material and processing feedstock. The resulting HC hexoses continue to rise through $t_{rx}$=14 minutes, at these relatively mild HC-hexan hydrolysis conditions. The HC xylose yield is a maximum of $C_{BX}=0.225$ at about $t_{rx}=9$ minutes. The HC xylose hydrolysis to $C_{BX}$ is 80% of the $C_{BO}$ of 0.280 at $T_{rx}=0$. The indicated sugar survival shows that xylose sugars in the hydrolysate, plus in the unhydrolyzed HC xykan remaining at $t_{rx} =9$ minutes is 0.866 of the initial HC xylan feedstock of 1,000.

The alpha-cellulose (AC) fraction of Pine-Soft-Wood requires more intense chemical reaction processing conditions in-order to hydrolyze the AC glucan polysaccharides into glucose-hexose sugars. The relative changes in the AC glucan feedstock, and resulting glucose sugar fractional yields, is a function of AC hydrolysis reaction times, $t_r$, =up to 14 minutes, at reaction temperature, $T_r$, $=180°$ C./356° F. and acid concentration $=2.0\%$. The decomposition of glucose sugar is occuring by chemical reaction following the glucose formation from alpha-cellulose hydrolysis.

Glucose sugar yields are compared: with-out recycle and with 50% recycle of unhydrolyzed AC feedstock. Maximum glucose yield, without recycle is $C_{BX}=0.584$, at $t_{rx}=8.2$ minutes. With a 50% recycle, it is $C_{BXX}=0,652$, at $t_{rxx}=7.0$ minutes. The ratio of glucose yield to sugar survival, at $t_{rxx}=7.0$ min., is 0.79 with 50% recycle. However, that ratio, at $t_{rx}=8.2$ minutes, is 0.75 without recycle. The recycle of 50% unhydrolyzed AC residue, following AC hydrolysis, results in a 12% increase in glucose yield and 15% shorter reaction time required.

BRIEF DESCRIPTION OF THE INVENTION

DESCRIPTION OF THE BEST MODE FOR CARRYING OUT THE INVENTION

Figure 1:
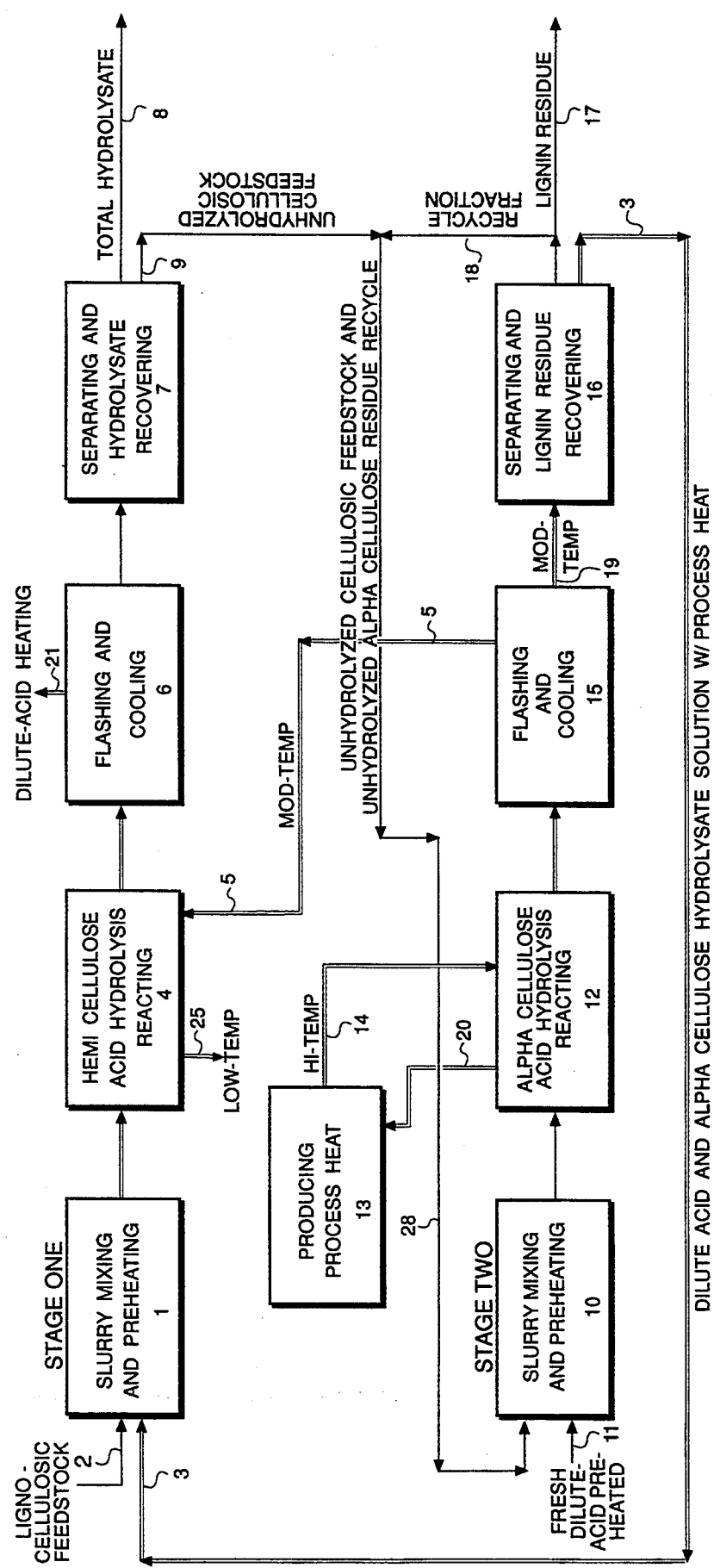
FIG. 1 is a block diagram depicting the continuous process of this invention, showing the ligno-cellulosic feedstock entering into the improved, dilute-acid hydrolysis process system, there-by producing a total sugars-hydrolysate single-solution final-product and a lignin residue solid final-product.
Figure 2:
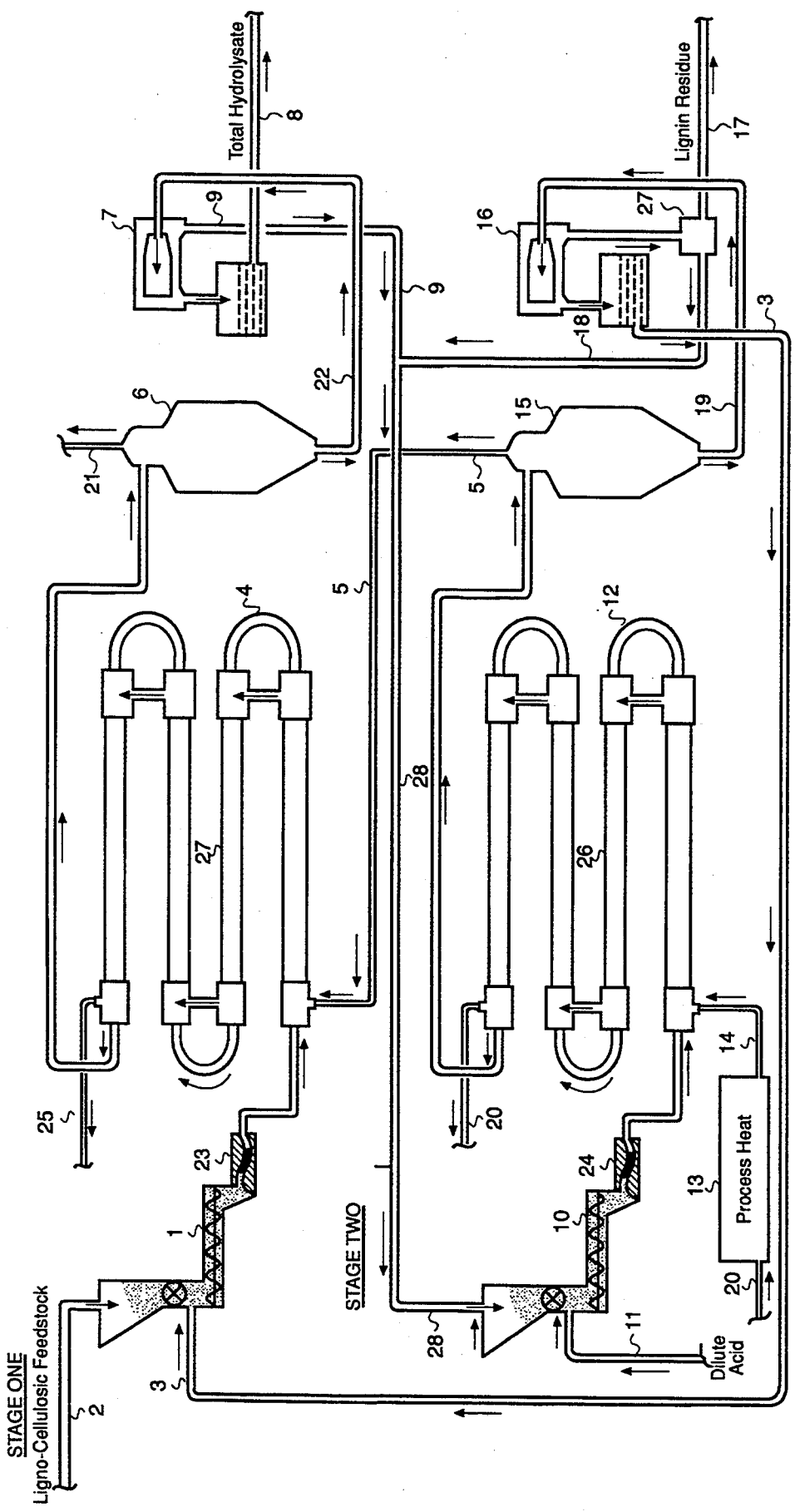
FIG. 2 is a schematic flow-diagram of the continuous process showing the best mode and preferred embodiment for carrying-out the improved process according to the invention.

As shown in FIG. 2, the preferred embodiment of the improved process of the invention is a two-stage system, made up of two double-tube heat-exchanger plug-flow-reactor and flash tank sub-systems, in-series.

Into stage-one of the best mode, a ligno-cellulosic feedstock, that is dry and ground to pass 10 mesh, is conveyed through conduit 2, and fed by a rotary-feeder to slurry-mixer 1, where it is admixed with a solution supplied by conduit 3, which is a process improvement of the invention. That solution in conduit 3 is a hot and pressurized dilute-acid and alpha-cellulose hydrolysate solution, which is conveying, by reverse inter-stage transfer-flow from stage-two to stage-one, the following: 1) surplus process heat, 2) dilute-acid catalyst and 3) ingredient and solution water.

The resulting pre-heated, fresh-feedstock dilute-acid slurry, containing about 12 wt % ligno-cellulosic feedstock solids, passes to a progressive cavity slurry-pump 23. Thereby it is pumped into the inner-tube of the stage-one double-tube heat-exchanger and plug-flow-reactor 4, wherein, additional process-heat is conveyed, from stage-two to stage-one, by conduit 5 into the heat exchanger 27, and there-by is indirectly added to the slurry inorder to immediately raise the feedstock slurry's saturated temperature and pressure up-to the pre-selected and controlled hemicellulose acid-hydrolysis reaction factors. That stage-two surplus process-heat is added indirectly to the stage-one reactor system 4. That is another process improvement of the invention, because it is supplied by the use of the reduced-pressure and temperature flash-steam, conveyed in conduit 5, by reverse, inter-stage transfer-flow, from the stage-two slurry flash-tank 15, as a surplus process heat supply.

The flow-rate of the slurry, in hemi-cellulose hydrolysis reactor 4, is controlled, by a pre-selected pumping rate, to be compatable and provide the required detention-time in plug-flow-reactor 4. The result is optimum hemicellulose hydrolysis of the fresh cellulosic feedstock for production of hemicellulose hydrolysate sugars, dissolved in solution of the slurry.

From reactor 4, the reacted slurry is continuously blown into the flash-tank 6, for reduced pressure, flash-steam production, also temperature is dropped to interrupt degradation of the hydrolysate sugars. The flash-steam from stage-one flash-tank 6 is, conveyed by conduit 21 to stage two, for continuous pre-heating of the fresh dilute-acid catalyst solution. The flashed slurry is conveyed from flash-tank 6 to the Stage-One separator 7, for separation of unhydrolyzed cellulosic residue from the solution of that slurry. That solution contains the combined total sugars hydrolysates from the two-stage cellulosic hydrolysis processing. It is conveyed-out, by way-of conduit 8, as the single-solution, liquid final-product. That liquid final-product is another process improvement of the invention.

In addition, the recovered, unhydrolyzed, cellulosic residue is conveyed from stage-one separator 7, by conduit 9, on into stage two. Therein, it is blended in with a recycled fraction of the unhydrolyzed alpha-cellulose hydrolysis residue, which may be up to about 50 wt %. That fractionation is made by fractionator 27, following the stage-two separator 16, and conveyed by conduit 18 into a blending with the unhydrolyzed cellulosic residue, conveyed in conduit 9. The remaining fraction of that unhydrolyzed alpha-cellulose hydrolysis residue is conveyed-out by conduit 17, as the solid lignin-residue final-product, which is an improvement of the process of the invention. The combination of the residues, from conduit 9 and conduit 18, is conveyed by conduit 28, to the stage-two slurry mixer 10, along with the fresh pre-heated dilute-acid solution, conveyed by conduit 11, for the admixing of the alpha-cellulose hydrolysis feedstock dilute-acid slurry. There-upon, the preheated slurry is transferred, at a flow-rate controlled by slurry-pump 24, to the alpha-cellulose hydrolysis plug-flow-reactor 12.

Indirectly, to the stage-two alpha-cellulose hydrolysis system, there is, incoming by conduit 14 which indirectly provides, a supply of high-temperature process-heat adequate for the overall two-stage hemicellulose and alpha cellulose hydrolysis processing operations. The relatively high-temperature process-heat, transferred indirectly to the alpha-cellulose hydrolysis slurry processing in plug-flow-reactor 12, provides for the pre-selected and controlled alpha-cellulose hydrolysis reaction saturated-temperature and pressure levels, for the pre-selected and controlled feedstock-slurry flow-rate, and thereby the required reaction detention-time. That total overall process heat supply is initially conveyed, for indirect heat-transfer by heat-exchanger 26, into reactor 12 in stage two, originally conveyed by conduit 14 from the proce ss heat producing source 13.

With a pre-selected and controlled slurry flow-rate, which provides the required cellulose hydrolysis reactor detention-time, the alpha-cellulose hydrolysis slurry then continuously flows from plug-flow-reactor 12 to stage-two flash-tank 15, for immediate slurry flashing to a reduced saturated pressure and reaction temperature. Thereby, the large supply of moderate-temperature flash-steam is continuously generated, along-with the related needed cooling of alpha-cellulose hydrolysate solution, for interrupting the degradation of it's glucose sugar. That flashed slurry then passes on, by conduit 19, to the stage-two slurry-separator 16, for separation of the reduced-pressure alpha-cellulose hydrolysate and dilute-acid solution, from unhydrolyzed alpha-cellulose lignin-residue, which passes, from the separator 16 on to the fractionator 27, to be fractionated. There-by is provided a fraction of up-to about 50 wt % of that unhydrolyzed alpha-cellulose residue for recycle by way-of conduit 18, inorder to-be combined and blended with all of the unhydrolyzed cellulosic feedstock residue, conveyed in conduit 9, from stage-one separator 7. Thereby that combination becomes the most-suitable feedstock for alpha-cellulose hydrolysis, which is an improvement of the process of this invention. Whereby the remaining fraction of the unhydrolyzed alpha-cellulose lignin-residue, conveyed by conduit 17 from stage-two, becomes the solid lignin-residue final-product, which is an improvement of the process of the invention.

Claims:

1. A two-stage dilute-acid hydrolysis process for the continuous saccharification of ligno-cellulosic biomass feedstock to produce hydrolysate sugars, comprising the following steps:

(a) substantially continuously admixing, in a first-stage, a lignocellulosic biomass feedstock and a dilute mineral acid to form an aqueous preheated feedstock slurry, of about 10 to 20 wt % solids, whereas said dilute mineral acid is in a hot pressurized aqueous solution, supplied by reverse inter-stage transfer from a second stage, said dilute mineral acid consisting of an alpha cellulose hydrolysate and dilute mineral acid in aqueous solution;

(b) introducing said preheated feedstock slurry into one end of a first tubular reactor and constricting the other end of said reactor so as to develop a back pressure therein;

(c) receiving indirectly into said aqueous feedstock slurry sufficient process heat supplied-by reverse inter-stage transfer of said second-stage flash-steam to heat and maintain said slurry at a pressure ranging from about 45 to 200 psia and at a temperature ranging from about 135° to 195° C. saturated steam equivalent;

(d) passing said heated feedstock slurry of step (c) into and through a reaction zone in said first tubular reactor, the length of said reaction zone and the flow rate of said heated slurry introduction being so selected as to afford an average reaction zone detention time of about 1.0 to 20 minutes;

(e) producing hemicellulose hydrolysate sugars in said reacting slurry;

(f) substantially continuously discharging and flashing said reacting slurry, thereby cooling by reducing the pressure and temperature of said reacting slurry, and also substantially continuously generating a first stage flashed steam supply;

(g) thereafter separating said flashed slurry into: 1.) a combined hydrolysate solution, and 2.) an unhyrolyzed hemicellulose hydrolysis residue;

(h) recovering said combined hydrolysate solution, which includes therein said hemicellulose hydrolysate sugars, said alpha cellulose hydrolyzate sugars, and said dilute-acid, thereby producing a single-solution final product of said saccharification.

(i) admixing, within said second stage, a blend of said unhydrolyzed hemicellulose hydrolysis residue, and of a recycled up-to 50 wt % fraction of an unhydrolyzed alpha cellulose hydrolysis residue, with a fresh preheated dilute mineral acid solution, to form a partially heated aqueous alpha cellulose hydrolysis slurry, of about 10 to 20 wt % solids, whereas said dilute acid is continuingly preheated by a first stage flash steam supply;

(j) introducing said aqueous preheated slurry into one end of a second tubular reactor and constricting the other end of said reactor so as to develop a back pressure therein;

(k) receiving indirectly into said aqueous alpha cellulose hydrolysis slurry, sufficient process heat, by way of a high temperature fresh process heat supply, to heat and maintain said aqueous slurry at a pressure ranging from about 100 to 200 psia and to a temperature ranging from about 165° to 260° C. saturated steam equivalent;

(l) passing said heated slurry into and through a reaction zone in said tubular reactor, the length of said reaction zone and the flow-rate of said heated slurry introduction being so selected as to afford an average reaction zone detention time of about 0.5 to 20 minutes;

(m) producing alpha cellulose hydrolysate sugars in said heated slurry in the presence of said dilute acid;

(n) there after continuously discharging and flashing said reacting slurry, thereby cooling and reducing it's pressure and temperature and generating a second stage flashed steam supply.

(o) separating said flashed slurry into: 1.) a hot reduced pressure alpha cellulose hydrolysate and dilute acid solution, and 2.) an unhydrolyzed alpha cellulose and lignin residue solids;

(p) recovering said hydrolysate and dilute acid solution, whereupon continuously transferring said solution to said first stage for admixing to slurry;

(q) recovering said unhydrolyzed alpha cellulose and lignin residue, whereupon continuously fractionating said residue, thereby an up to 50 wt % fraction is recycled within second stage and blended with said unhydrolyzed hemicellulose hydrolysis residue from said first stage, thereafter admixing said blend to said second stage slurry, whereby said remaining fraction is a unhydrolyzed alpha cellulose lignin residue and is the final solid product of said saccharification.

2. Process according to claim 1 wherein said first stage flashed steam supply is generated with a pressure of about 15 to 30 psia and a temperature of about 100° to 120° C. saturated steam equivalent.

3. Process according to claim 1 wherein said second stage flashed steam supply is generated with a pressure of about 45° to 200 psia and at a temperature of about 135° to 200° C. saturated steam equivalent.

4. Process according to claim 3 further comprising continuously supplying said hemicellulose hydrolysis processing process heat by reverse interstage transfer to said first stage by continuously adding the flashed steam supply of step (n).

5. Process according to claim 1 wherein said dilute mineral acid is selected from the group consisting of sulfuric acid, sulfurous acid, and phosphoric.

6. Process according to claim 1 wherein said feedstock is selected from the group consisting of ligno-cellulosic biomass, soft wood, hard wood, wood wastes, logging slash, crop residues, sugar cane baggase, and rice hulls.

7. Apparatus for a two-stage dilute-acid hydrolysis process for the continuous saccharification of feedstocks selected from the group consisting of lignocellulosic biomass and cellulosic materials to produce monosaccharide hydrolysate sugars, wherein the first stage comprises:

(a) admixing means for a fresh feedstock and a hot, pressurized dilute-mineral-acid solution, forming a preheated aqueous fresh feedstock slurry, wherein said dilute acid solution consists of a hot pressurized alpha cellulose hydrolysate and a dilute-acid in-water solution, being supplied by a reverse interstage transferring means from said second stage;

(b) pumping and pressurizing means for the introduction of said feedstock slurry into one end of an inner tube of a plug flow reactor in a double-tube, heat-exchanger, plug-flow-reactor system, wherein said inner-tube has a constricting means at the other end, so as to develop a back pressure therein;

(c) indirect process heating means for whereby supplying second stage flashed steam, by a reverse, interstage transferring means, indirect heat transferring means for heating said pressurized slurry, thereby sufficiently providing for hemicellulose hydrolysis processing, at a saturated pressure ranging from about 45 to 200 psia and at a temperature ranging from about 135° to 195° C., within said plug flow reactor, and with a pumping rate control means for meeting the required flow rate of said heated slurry within the said plug flow reactor, thereby meeting the required reacting slurry detention time;

(d) reacting slurry discharging and flashing means for cooling by reducing said reacting slurry pressure and temperature and for generating said first stage flashed steam supply;

(e) flashed slurry separating means for providing recovery of: 1.) a combined hydrolysates single-solution final product and 2.) an unhydrolyzed hemicellulose hydrolysis residue;

(f) means for supplying said unhydrolyzed hemicellulose residue into said second stage, means for blending, an up-to 50 wt % fraction of said unhydrolyzed alpha cellulose residue, and said unhydrolyzed hemicellulose for admixing a fresh preheated dilute-acid in-water solution, and said unhydrolyzed hemicellulose thereby forming an alpha cellulose hydrolysis feedstock slurry;

(g) slurry pumping and pressurizing means for introducing said alpha cellulose hydrolysis feedstock slurry, into an inner tube of a plug flow reactor;

(h) high temperature process heat supplying means and an indirect heat exchanging means, for providing sufficient indirect process heat to said alpha cellulose hydrolysis slurry;

(i) partially flashing and reduced pressurizing means for reacting slurry, and said generated flashed steam and a recovering means for said reduced pressure and temperature slurry;

(k) separating and recovering means for said slurry as a reduced-pressure alpha cellulose hydrolysate and dilute-acid solution and an unhydrolyzed alpha cellulose lignin residue solids;

(l) pressurized slurry pumping means for reverse inter stage transfering of said reduced pressure alpha cellulose hydrolysate and dilute-acid solution.

8. Apparatus according to claim 7, further including a surplus flashed steam recovering means, in each stage separately, and also including a pressurized slurry flashing tank means connected by a blow-pipe means.

9. Apparatus in claim 7, wherein further including a centrifugal slurry separating means for removal and recovery of unhydrolyzed solids residue.

10. Apparatus according to claim 7 further including a second stage recovering and means for the unhydrolyzed alpha cellulose unhydrolysis residue, and a fractionation means, and further comprising a conveying means.

* * * * *